US011009157B2

(12) United States Patent
Ruaro et al.

(10) Patent No.: US 11,009,157 B2
(45) Date of Patent: May 18, 2021

(54) JOINT FOR SUBMARINE CONNECTIONS

(71) Applicant: De Pretto Industrie S.R.L., Schio (IT)

(72) Inventors: Enrico Ruaro, Dueville-Povolaro (IT); Andrea Dai Zotti, Caldogno (IT)

(73) Assignee: DE PRETTO INDUSTRIE S.R.L., Schio (IT)

(*) Notice: Subject to any disclaimer, the term of this patent is extended or adjusted under 35 U.S.C. 154(b) by 733 days.

(21) Appl. No.: 15/573,306

(22) PCT Filed: Mar. 14, 2016

(86) PCT No.: PCT/IB2016/051442
§ 371 (c)(1),
(2) Date: Nov. 10, 2017

(87) PCT Pub. No.: WO2016/181233
PCT Pub. Date: Nov. 17, 2016

(65) Prior Publication Data
US 2018/0106401 A1    Apr. 19, 2018

(30) Foreign Application Priority Data
May 14, 2015    (IT) ............... VI2015A000121

(51) Int. Cl.
F16L 17/08    (2006.01)
F16L 27/08    (2006.01)
F16L 17/02    (2006.01)

(52) U.S. Cl.
CPC ............. *F16L 17/08* (2013.01); *F16L 27/082* (2013.01); *F16L 27/0816* (2013.01);
(Continued)

(58) Field of Classification Search
CPC ......... F16L 17/02; F16L 17/05; F16L 17/015; F16L 17/017; F16L 27/0816;
(Continued)

(56) References Cited

U.S. PATENT DOCUMENTS 2,394,715 A * 2/1946 Phillips ............... F16L 27/0828
285/98
2,459,981 A * 1/1949 Warren ............... F16L 27/0828
285/111
(Continued)

FOREIGN PATENT DOCUMENTS

DE    102012024557 A1    6/2014
EP        1632705 A1    3/2006
(Continued)

OTHER PUBLICATIONS

International Preliminary Report on Patentability for Application No. PCT/IB2016/051442 dated May 4, 2017 (19 pages).
(Continued)

Primary Examiner — Matthew Troutman
Assistant Examiner — James A Linford
(74) Attorney, Agent, or Firm — Michael Best & Friedrich LLP

(57) ABSTRACT

The present invention concerns a rotatable coupling (60) for connecting pipes, comprising a first hollow female element (61) suited to be connected, for example, to a first pipe portion (51), and a second tubular male element (6) with a first end portion at least partially housed inside the first female element (61) so as to define an inner space for the passage of a fluid, and with a second end portion suited to be connected to a second pipe portion (52). Said first and said second element (61, 6) can be rotated with respect to each other, said second tubular male element (6) comprising a first abutment surface (6S). Furthermore, the rotatable coupling (60) comprises a third hollow tubular element (12) housed inside the first female element and provided with a second abutment surface (1S) substantially opposite the first abutment surface (6S) so as to define a first interspace (I), and the third tubular hollow element (12) can be translated along a direction substantially orthogonal to the first and the
(Continued)

second abutment surface (6S, 1S) between a closed configuration, in which the first and the second abutment surface (6S, 1S) are positioned at a minimal mutual distance, and an open configuration, in which the first and the second abutment surface (6S, 1S) are positioned at a distance that exceeds said minimal mutual distance.

17 Claims, 8 Drawing Sheets

(52) U.S. Cl.
CPC ....... *F16L 27/0828* (2013.01); *F16L 27/0832* (2013.01); *F16L 17/02* (2013.01); *F16L 2201/30* (2013.01)

(58) Field of Classification Search
CPC . F16L 27/0828; F16L 27/082; F16L 27/0832; F16L 2201/30; E21B 17/05; E21B 17/015; E21B 17/017; E21B 21/02; E21B 43/0107
See application file for complete search history.

(56) References Cited

U.S. PATENT DOCUMENTS

| | | | |
|---|---|---|---|
| 5,149,148 A * | 9/1992 | Taeuber, Jr. | F16L 37/148 |
| | | | 285/276 |
| 2007/0158112 A1* | 7/2007 | Schapel | F16J 15/3236 |
| | | | 175/195 |
| 2012/0187675 A1 | 7/2012 | Tausch | |

FOREIGN PATENT DOCUMENTS

| | | |
|---|---|---|
| GB | 742555 A | 12/1955 |
| GB | 2132297 A | 7/1984 |
| JP | H11248072 A1 | 9/1999 |
| WO | 2010092326 A1 | 8/2010 |

OTHER PUBLICATIONS

International Search Report and Written Opinion for Application No. PCT/IB2016/051442 dated Jun. 28, 2016 (13 pages).

* cited by examiner

JOINT FOR SUBMARINE CONNECTIONS

STATE OF THE ART

The present invention concerns the field of pipes and/or ducts. In particular, the present invention concerns the field of submarine pipes.

In greater detail, the present invention concerns a solution suited to make it easier to install and/or lay pipes and/or ducts of the above mentioned type. In even greater detail, the subject of the present invention is a solution intended to overcome the drawbacks and/or problems that occur when pipes and/or ducts of the above mentioned type are installed and/or laid according to the procedures commonly adopted in the known art.

Finally, the subject of the present invention includes a coupling for pipes of the above mentioned type that makes it possible to overcome the drawbacks and/or problems that occur when the same pipes and/or ducts are installed and/or laid according to the procedures known in the art.

DESCRIPTION OF THE STATE OF THE ART

Several methods for installing and/or laying pipes and/or ducts, in particular submarine pipes and/or ducts, are known in the art. According to one of said methods, a flexible pipe having the desired cross section is unwound from a reel positioned on a ship and than laid on the sea bottom.

First of all, it should be underlined that intermediate pipe fittings are used for laying the pipe, said pipe fittings being interposed between successive pipe portions having a predefined length.

Said intermediate pipe fittings have multiple and different purposes, among which, for example, the purpose of firmly anchoring the pipe to the sea bottom (thanks to their weight, for example), as well as the purpose of branching off, in particular of connecting possible secondary or branch pipes to the main pipe or duct.

Obviously, each one of the pipe fittings used must guarantee the passage of a fluid inside it (for example gas, oil or similar fluids), as well as the tightness of the connection with the two portions of the pipe or duct respectively located upstream and downstream of the pipe fitting, in order to avoid fluid leakages from the inside of the pipe towards the outside and/or the infiltration of external agents, in particular of sea water.

According to the latest techniques, the pipe fittings are connected to the main pipe before being laid or placed on the sea bottom, which means that each pipe fitting is connected to the pipe portion that was previously laid and to the successive pipe portion that is still on the ship or vessel.

However, this type of use and/or connection of the pipe fittings gives rise to further problems that are still, if not completely, at least partially unsolved.

In fact, it should be noted that during the laying operations the pipe, especially if unwound from a reel, is subjected to considerable twisting forces that, if they are not compensated for, may affect the positioning of the pipe and/or of the pipe fittings; for example, the pipe fittings may not be laid on the sea bottom in an optimal way (thus negatively affecting the stability of the pipe) and/or the pipe may be subject to breakages.

In order to at least partially overcome the drawbacks summed up above, the operators working in this sector have developed a tendency to use rotatable couplings to connect the pipe fittings to the pipe portions respectively located upstream and downstream of each pipe fitting; the use of rotatable pipe fittings allows the pipe, if subjected to twisting forces, to rotate substantially around its longitudinal axis, independently of (released from) the pipe fitting which therefore can be positioned in an optimal manner even if the pipe is subjected to a twisting force.

These solutions also give rise to the problem of guaranteeing the tightness of the couplings which usually comprise a first element intended to be fixed to the pipe fitting and a second element intended to be fixed to the pipe, said second element being coupled with the first element in a rotating manner.

The problem that arises is thus evident, as on one side it is necessary to guarantee the mutual rotation of the two elements of the coupling and on the other side it is necessary to guarantee the tightness of the connection between the two elements of the coupling.

According to other solutions known in the art, sealing elements are used (interposed between the two elements of the coupling) that can be activated once the coupling and/or the corresponding pipe fitting has been laid; in practice, during the pipe laying procedure the sealing elements are shaped in such a way that they do not necessarily guarantee tightness, but that they at least allow the rotation of the elements of the coupling (so as to compensate for the twisting forces to which the pipe may be subjected), wherein, once the pipe laying procedure has been completed, the sealing elements are switched to a second configuration intended to guarantee the tightness of the connection between the elements of the coupling and possibly also to prevent their mutual rotation.

These solutions also include the use of submarine robots for switching the sealing elements from the non-sealing to the sealing configuration, and are therefore particularly difficult, especially in consideration of the fact that in some cases the pipes are laid down to depths that may even reach 3500 m. Said operations, therefore, are particularly demanding and very expensive.

On the other hand, in most cases the solutions known in the art, according to which the sealing elements of the couplings are switched to the sealing configuration before laying the pipe, do not guarantee the mutual rotation of the elements of the coupling, and therefore do not make it possible to properly compensate for the twisting forces to which the pipe is subjected.

The main object of the present invention is thus to solve or at least partially overcome the problems that characterize the solutions known in the art.

In particular, it is a further object of the present invention to provide an innovative solution in relation to the production of a connection coupling suited to be interposed, depending on the circumstances and/or the needs, both between two successive pipe portions and between a pipe fitting and a pipe portion, wherein said connection coupling should guarantee both the tightness of the connection between the two elements of the coupling and the mutual rotation of the elements of the coupling. It is a further object of the present invention to provide an innovative solution that makes it possible to produce a coupling of the type that does not require any operations (in particular, submarine operations) for switching the sealing elements to the sealing or non-sealing configuration. Finally, it is another object of the present invention to provide a connection coupling of the type described above that can be produced and installed with simple procedures and/or operations and at limited cost.

SUMMARY OF THE PRESENT INVENTION

The present invention is based on the general consideration according to which the problems found in the art can be at least partially overcome by means of a rotatable coupling for pipes made using a switching element that through elastic thrusting means acts on sealing elements interposed between the mutually revolving parts of the coupling itself, in such a way as to guarantee that the switching element automatically comes to be set in the closed configuration, while by counteracting the thrust exerted by said elastic thrusting means it will be possible to set the switching element in the open configuration (or no-contact configuration), in which the elements of the coupling can freely rotate with respect to one another.

The sealing elements can be such as to guarantee a degree of tightness that is proportional to the pressure to which they are subjected, in particular due to a fluid exerting pressure on them. In other words, according to an embodiment of the present invention the sealing elements must be suited to be switched between a configuration of minimum tightness (and minimum contact or no contact with the revolving elements of the coupling, in which the mutual rotation between the elements of the pipe is guaranteed) and a configuration of increased tightness (with increased contact with the revolving elements of the coupling, in which tightness is guaranteed and leakages and/or infiltrations are prevented) automatically, in particular through the exploitation of the pressure exerted on them by a fluid. In particular, according to a further consideration on which the present invention is based, the sealing elements will assume the configuration of maximum tightness by exploiting both the pressure exerted on them by a fluid (in particular both from the outside of the coupling towards the inside in order to avoid infiltrations of fluid from the outside towards the inside of the coupling, and from the inside of the pipe, avoiding fluid leakages and/or losses from the inside towards the outside), as well as the pressure exerted on them by the switching element in turn activated by the elastic means (one or more springs or similar elements).

It has been considered, in fact, that the spontaneous and/or automatic switch-over of the sealing elements according to the procedures summed up above first of all makes it possible to install the coupling out of sea (for example, on board a ship) and at the same time guarantees the mutual rotation between the revolving parts of the coupling, thus making it possible to properly compensate for the twisting forces to which the pipe is inevitably subjected (and therefore to conveniently position the pipe fittings and/or the pipe), as well as perfect tightness of the connection between the revolving parts of the coupling once the pipe has been laid, in particular with no need to intervene on the coupling and/or on its sealing elements with submarine operations or in any case operations performed once the pipe has been laid.

Based on the considerations summed up above, according to a first embodiment of the present invention the subject of the latter is thus a rotatable coupling for connecting pipes, said coupling comprising a first hollow female element suited to be connected, for example, to a first pipe portion or to a pipe fitting and a second tubular male element having a first end portion at least partially housed inside said first female element, in such a way as to define an inner common space for the passage of a fluid, and a second end portion suited to be connected to a second pipe portion, said first and said second element being suited to be rotated with respect to each other, said second tubular male element comprising a first abutment surface, wherein said rotatable coupling furthermore comprises a third tubular hollow element housed inside said first female element and having a second abutment surface substantially opposite said first abutment surface in such a way as to define a first interspace, and wherein said third hollow element can be translated along a direction that is substantially orthogonal to said first and said second abutment surfaces between a closed configuration, in which said first and said second abutment surface are positioned at a minimal distance from each other, and an open configuration, in which said first and said second abutment surface are positioned at a distance from each other that is longer than said minimal mutual distance.

According to an embodiment, said coupling comprises elastic means that are suited to push said third hollow element towards said closed configuration.

Preferably, at least one first elastic sealing element is interposed between said first and said second abutment surface, wherein, with said third hollow element in said closed configuration said at least one first elastic sealing element is placed in contact with both said first abutment surface and said second abutment surface.

According to an embodiment, with the third hollow element (switching element) in said closed configuration, the surface areas of the portions of the external surface of said elastic sealing element in contact respectively with said first abutment surface and said second abutment surface are minimal if no fluid is present and increase when said first elastic sealing element is subjected to pressure by a fluid flowing inside said first interspace.

Preferably, said first and said second abutment surface are of the annulus-shaped type and substantially perpendicular to the direction of longitudinal extension of said second tubular male element, and/or said at least one first elastic sealing element is in the shape of a ring.

If necessary, said first annular sealing element is hollow, with open cross section, and is provided with an opening or a slit that places the inner space delimited by said first annular sealing element in communication with the space outside said first annular sealing element.

According to an embodiment, in a sectional view said first annular sealing element comprises two portions arranged in such a way as to define or enclose an inner angle and connected by a connecting portion, the external surfaces of each one of said two portions arranged so as to form an angle being respectively in contact with said first and said second abutment surface when said third hollow element is in said closed configuration.

Advantageously, each one of said two portions arranged so as to form an angle comprises a rectilinear subportion extending from said connecting portion and a curved end portion, said two curved end portions being opposite each other in such a way as to delimit said opening or slit.

If necessary, one between said first tubular male element and said third tubular hollow element comprises a first annular groove or lowered portion that extends from the respective abutment surface, wherein said first annular sealing element is at least partially housed in said first annular groove.

According to an embodiment, said first groove is in communication with the inner space mutually defined by said first hollow female element and said second tubular male element through said first interspace.

Preferably, said opening or slit is directed towards the inner space of said coupling defined by said second tubular male element and said first hollow female element.

According to an embodiment, said first hollow female element and said third hollow tubular element respectively define a third abutment surface and a fourth abutment surface substantially opposite each other, in such a way as to define a second interspace, wherein in this case, with said third hollow element in said closed configuration said third and said fourth abutment surface are positioned at a minimal distance from each other, while with said third hollow element in said open configuration said third and said fourth abutment surface are positioned at a mutual distance that exceeds said minimal mutual distance.

If necessary, at least one second elastic annular sealing element is interposed between said third and said fourth abutment surface, wherein in this case, with said third hollow element in said closed configuration said at least one second elastic sealing element is placed in contact with both said third abutment surface and said fourth abutment surface.

Further embodiments of the present invention are described in detail in the claims.

BRIEF DESCRIPTION OF THE DRAWINGS

Further advantages, objects and characteristics of the present invention are defined in the claims and will be illustrated below in the following description of the embodiments of the invention illustrated in the enclosed drawings, in which equivalent or corresponding characteristics and/or component parts of the present invention are identified by the same reference numbers. In particular:

DETAILED DESCRIPTION OF THE PRESENT INVENTION

Figure 1:
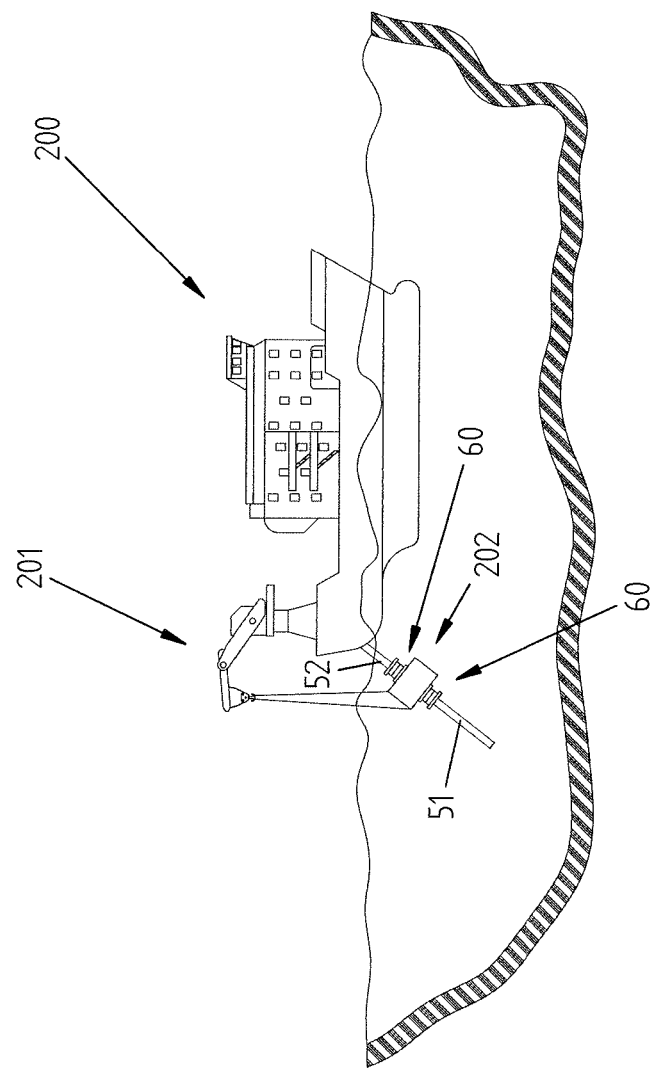
FIG. 1 shows the methods for laying and/or installing a pipe, in particular a submarine pipe or duct.

Although the present invention is described below with reference to its embodiments illustrated in the drawings, the present invention is not limited to the embodiments described below and illustrated in the drawings.

On the contrary, the embodiments described below and illustrated in the drawings clarify some aspects of the present invention, the scope of which is defined in the claims.

The present invention can be advantageously employed in particular, but not exclusively, in the field of pipe and/or duct laying procedures. In particular, the present invention can be advantageously employed when used for installing and/or laying submarine pipes and/or ducts.

This is the reason why the present invention is illustrated and described here below with special reference to its possible applications in the field of laying and/or installation procedures for submarine pipes and/or ducts.

The possible applications of the presente invention, however, are not limited to the installation and/or laying of submarine pipes and/or ducts; on the contrary, the present invention can also be advantageously applied in all those situations in which it is necessary to connect two portions of any pipe, when the connection must guarantee both tightness between the mutually connected parts and the mutual rotation of the parts themselves.

The methods and/or main operations for installing and/or laying a submarine pipe and/or duct are concisely described here below, with reference to FIG. 1.

FIG. 1 shows a ship or vessel indicated by the reference number 200 and provided with a crane 201. As explained above, according to the latest techniques for installing and/or laying submarine pipes and/or ducts, pipe fittings 202 (one of which is shown in the figure) are connected to the main pipe before being laid on the sea bottom; in particular, as shown in the figure, the pipe fitting 202 is connected to the previously laid pipe portion 51 and to the successive portion 52 that is still on the ship or vessel, for example wound on a reel (not illustrated in the figure).

According to the present invention, two rotatable couplings 60 are used to connect the pipe fitting to the pipe portions 51 and 52, said rotatable couplings 60 being respectively interposed between the portion 51 and the pipe fitting 202 and between the pipe fitting 202 and the portion 52.

The connection of the rotatable couplings 60 is performed on board the ship according to essentially known procedures, after which the pipe fitting 202 is positioned on the sea bottom with the aid of the crane, wherein while the pipe fitting 202 is being laid the pipe portion 52 is further unwound from the reel.

Figure 2:
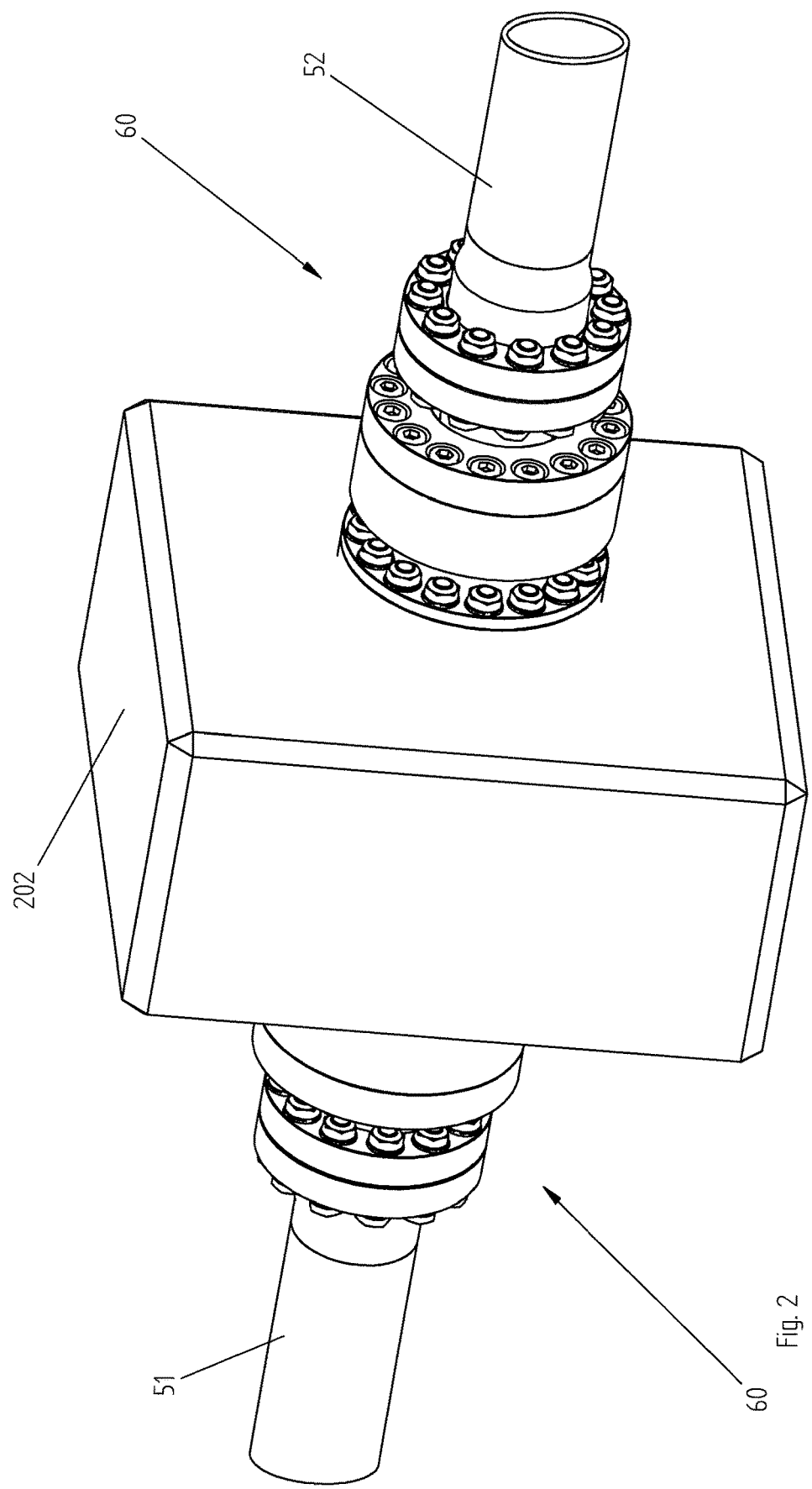
FIG. 2 shows a perspective view of a rotatable coupling according to an embodiment of the present invention, the coupling being interposed between a pipe fitting and a portion of a pipe or duct.

The main component parts of a rotatable coupling 60 according to an embodiment of the present invention are described here below with reference to FIGS. 2 and 3.

As shown in the figures, the pipe fitting 202 comprises a hollow box-shaped main body suited to allow the passage of a fluid and therefore to be interposed between and connected to two successive pipe portions 51, 52. For this purpose, on two opposite sides, the pipe fitting 202 is respectively provided with two sets of holes (for example, internally threaded holes) suited to be engaged with bolts through which each connection flange 1, respectively of the two couplings 69, is fixed to the pipe fitting 202 (in the case shown in the figure, on two opposite sides of the same pipe fitting), thus connecting and/or coupling to the pipe fitting 202 two rotatable couplings 60 according to the present invention (in particular, respectively interposed between the pipe fitting 202 and the pipe 51 and between the pipe fitting 202 and the pipe 52).

Obviously, if the pipe fitting 202 needs to be used as a branch connection, it may comprise solutions (flanges or similar elements not illustrated in FIG. 2) that are suited, in fact, to allow its connection to branch pipes, with or even without rotatable couplings.

Figure 3:
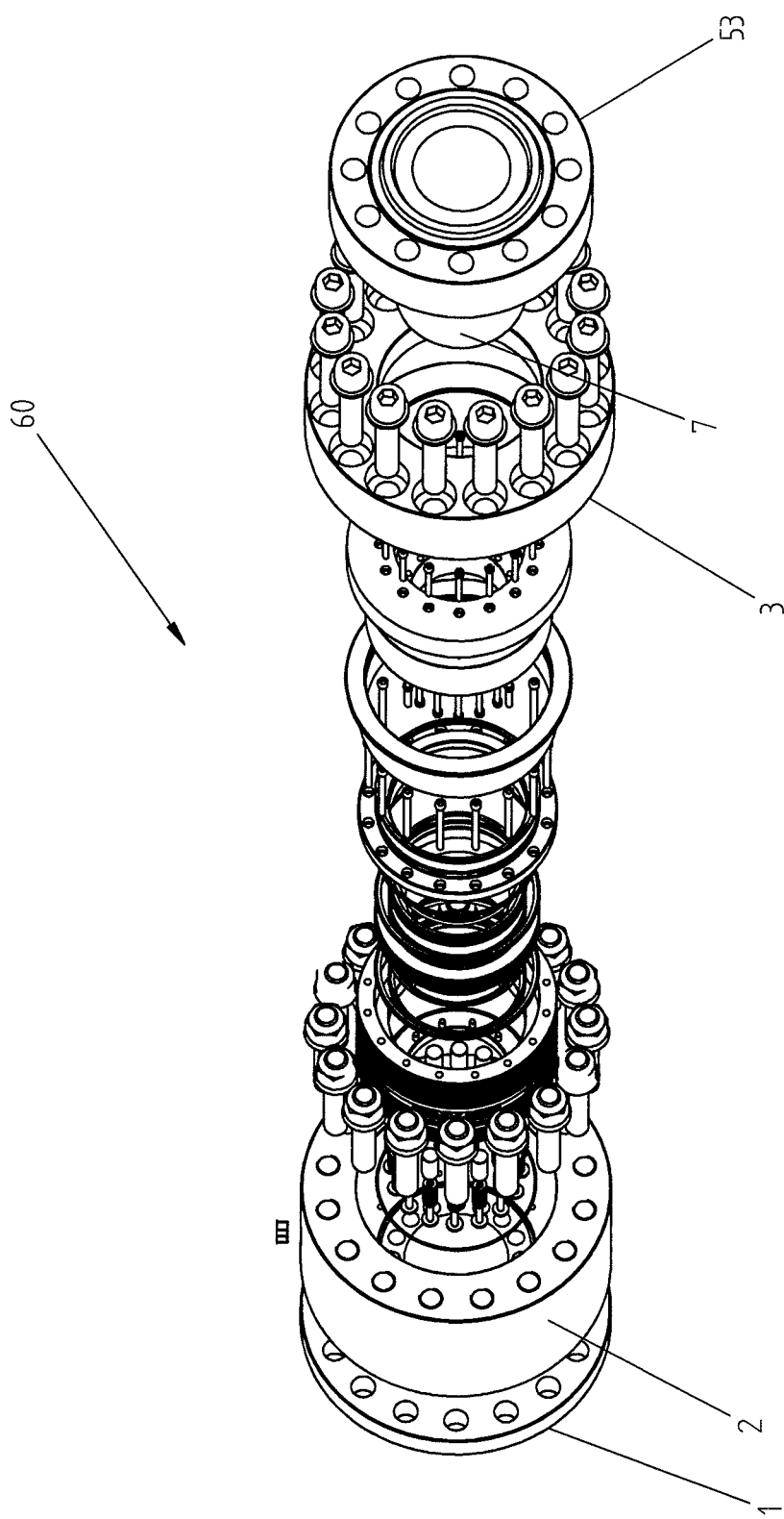
FIG. 3 shows an exploded view of a rotatable coupling according to an embodiment of the present invention.

With particular reference to FIG. 3, it can be observed that the coupling 60 according to the embodiment of the present invention illustrated therein comprises a hollow component 2 (with the flange 1), an annular element or flange 3, an annular element or flange 4 and an annular element or flange 5 connected to one another (using threaded bars, bolts or similar means) so as to form a hollow female element 61, wherein the hollow female element or body 61 is fixed to the pipe fitting 202 through the flange 1.

A further tubular male element 6, suited to be coupled with the pipe portion 52 through a further flange 53, is revolvingly housed inside the hollow element 61.

The tubular male element 6, in particular, is formed by a tubular component 7, a flange or annular component 8 and a further flange or annular component 9, wherein the components 7, 8 and 9 are connected to one another (for example using threaded bars, bolts or similar means) so as to form, in fact, the tubular male element 6.

Therefore, since the tubular male element 6 is rigidly fixed to the pipe 52 through the flange 53, and furthermore the hollow female element 61 is rigidly fixed to the pipe fitting 202, and finally the tubular male element 6 is revolvingly housed inside the hollow element 61, it can be understood that the rotatable coupling 60 allows the pipe 52 to be revolvingly coupled with the pipe fitting 202 so that any twisting forces acting on the pipe while it is being installed or laid are properly compensated for.

Furthermore, two further annular components 10 and 11 are mutually connected so as to form a third hollow body 12 housed inside the first hollow body 61 and suited to be translated inside said first hollow body 61 (see the detailed description provided here below).

The component parts 2, 3, 4 and 5 of the hollow male element 61, the component parts 6, 7 and 8 of the tubular male element 6 and the component parts 10 and 11 of the third hollow switching body 12 are shaped in such a way that when said component parts are mounted according to a predefined succession, the tubular male element 6 and the third hollow switching body 12 cannot be released from the hollow female body 61, in particular they cannot exit from the hollow element 61.

The procedures for assembling the rotatable coupling 60, in particular the succession according to which the component parts 2, 3, 4, 5, 7, 8, 9, 10 and 11 are mounted and/or mutually coupled together and/or fixed to the pipe fitting 202 are not necessarily included in the scope of the present invention and therefore they are not described herein for the sake of brevity.

Further component parts and/or characteristics of the rotatable coupling 60 according to the present invention are described here below with particular reference to FIG. 4.

Figure 4:
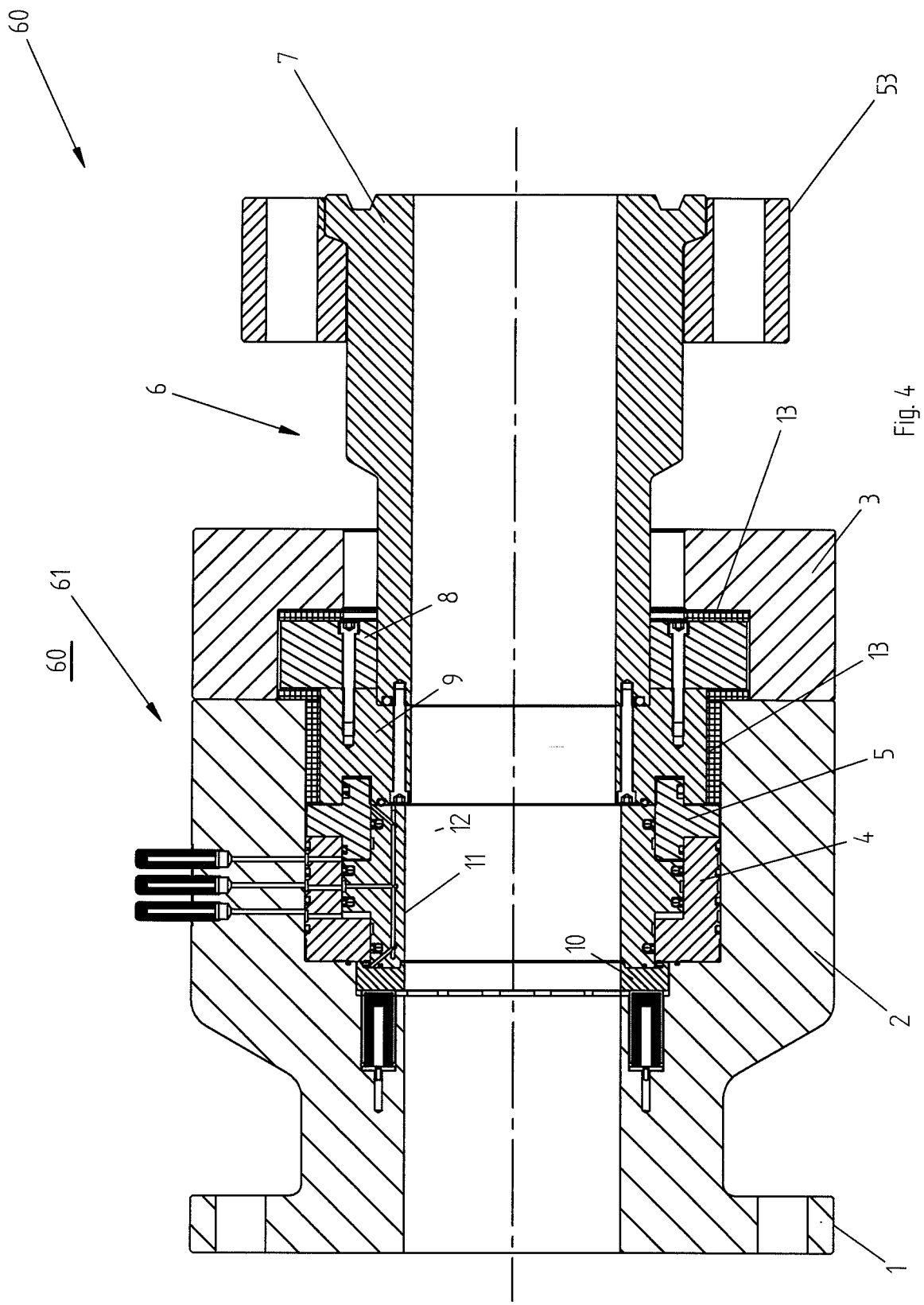
FIG. 4 shows a longitudinal sectional view of a rotatable coupling according to an embodiment of the present invention.

As shown in FIG. 4, the coupling 60 represented therein comprises a plurality of means suited to facilitate the mutual rotation of the hollow female element 61 and the tubular male element 6; said means are represented with dots and positioned where it is necessary and/or convenient to reduce friction between the male element 6 and the hollow body 61, and comprise for example one or more bushings and/or bearings 13 interposed between the external surface of the tubular male element 6 and the inner surface of the hollow female body 61, and/or in any case between the adjacent surfaces of the hollow element 61 and of the tubular element 6, wherein the opposition between the surfaces may generate such friction as to affect the mutual rotation of the hollow element 61 and the tubular element 6.

Furthermore, it should be underlined that between the component parts mutually fixed in a rigid manner, for example between the hollow body 2 and the flange 3, there may be sealing elements, for example O rings, interposed between the adjacent surfaces of said component parts, possibly housed in annular grooves suited to accommodate a corresponding number of sealing elements, such as O rings or similar elements.

Further component parts and/or characteristics of the coupling 60 are described below with reference to FIGS. 5 and 6, in which component parts and/or characteristics of the coupling 60 already described with reference to other figures are identified by the same reference numbers.

Figure 5:
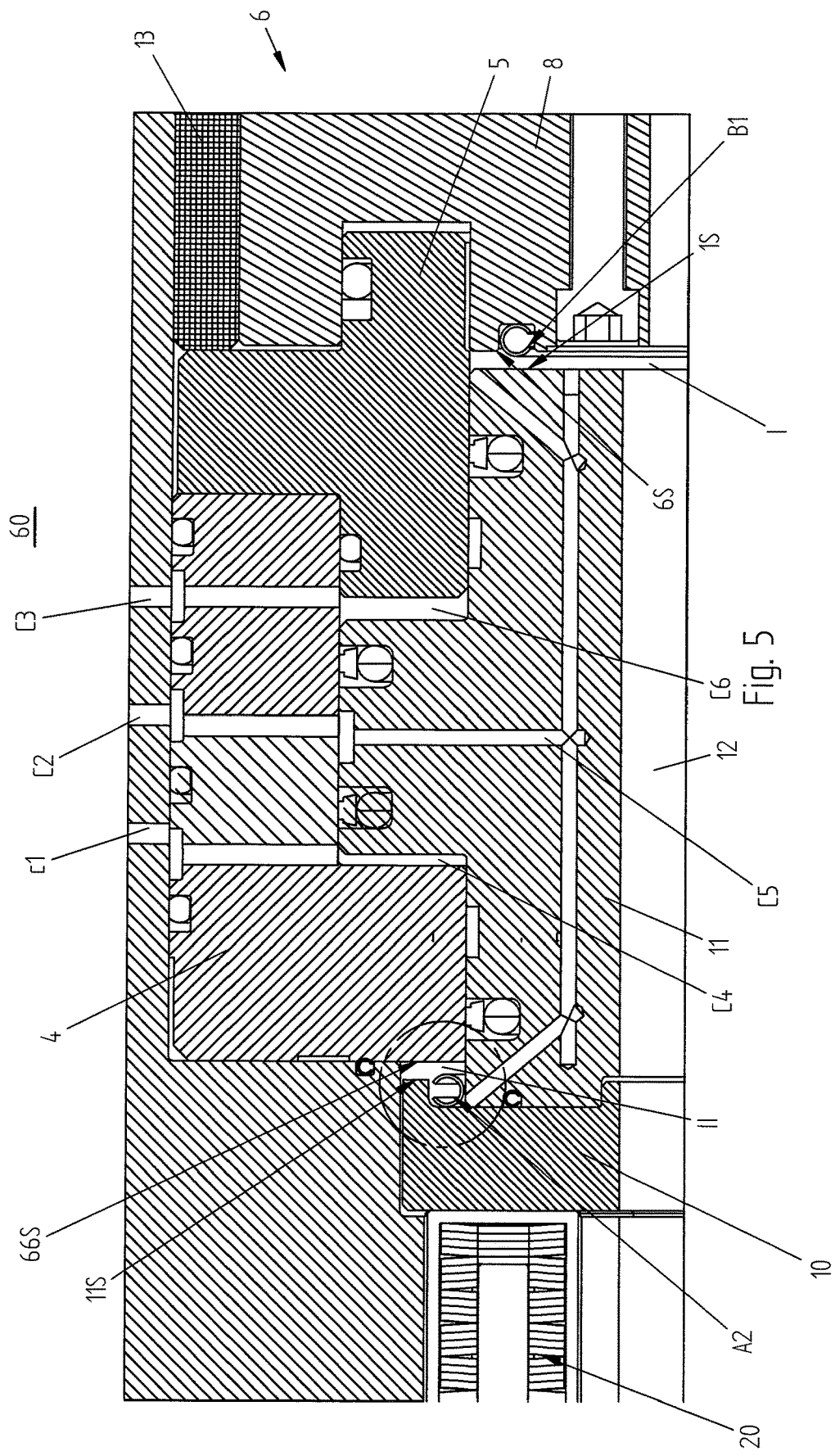
FIG. 5 shows a sectional view of a detail of the rotatable coupling according to an embodiment of the present invention with the elements of the coupling in a first mutual position.
Figure 6:
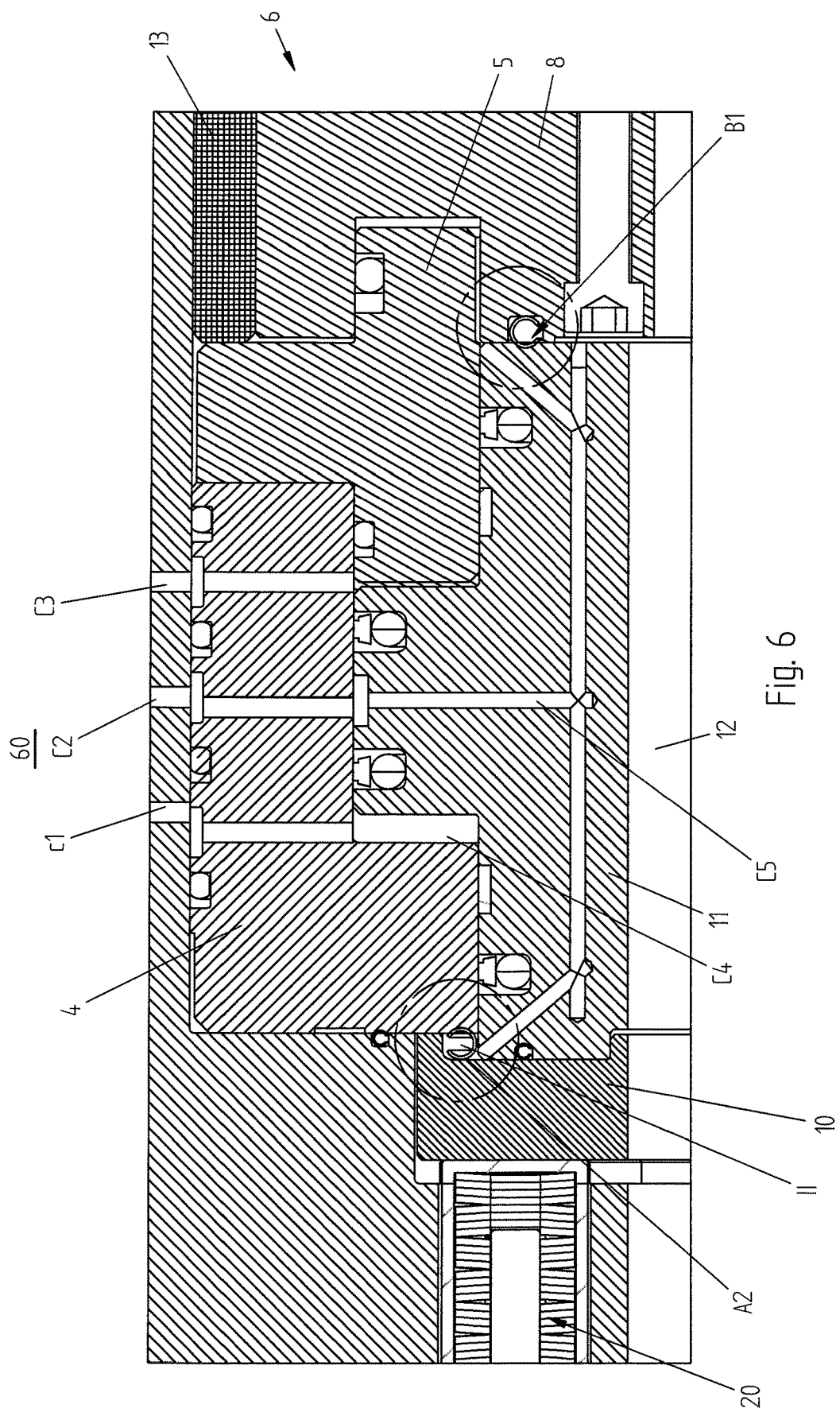
FIG. 6 shows a sectional view of a detail of the rotatable coupling according to an embodiment of the present invention with the elements of the coupling in a second mutual position.

First of all, it should be noted from FIGS. 5 and 6 that the tubular male element 6, in particular the flange 8 of the male element 6, comprises a first abutment surface 6S substantially perpendicular to the longitudinal axis of the element 6 (and thus of the coupling 60) and having the shape of an annulus.

In the same way, the hollow switching body 12 (constituted by the flanges 10 and 11 rigidly fixed to each other) comprises a second abutment surface 1S opposite the first abutment surface 6S in such a way as to delimit a first interspace I.

Furthermore, a third abutment surface 66S is defined by the hollow female body 60 (in particular by flange 4), while a fourth abutment surface 11S is defined by the hollow switching body 12 (in particular by flange 10), said third abutment surface 66S and said fourth abutment surface 11S being in the shape of an annulus and opposite each other in such a way as to define a second interspace II. Finally, further sealing elements B1 and A2 are arranged between the surface 6S of the tubular female element 6 and the surface 1S of the switching element 12 (of flange 11) and between the surface 66S of the hollow female body 60 (of flange 4) and the surface 11S of the switching element 12 (of flange 10).

Said further sealing elements are used for the purpose of guaranteeing mutual tightness between the male element 6 and the female element 61 (and thus of coupling 60), avoiding fluid losses and/or leakages from the inside towards the outside, as well as infiltrations of external agents (for example, sea water) from the outside towards the inside.

Said further sealing elements are described here below with particular reference to Figures from 7 to 9.

First of all it should be noticed, as can be observed in the figures, that each one of the abutment surfaces 6S and 11S, respectively of the tubular male element 6 and of the switching element 12, comprises an annular groove (respectively groove S1 and groove S2, see also FIGS. 7 and 8) that respectively extend from the surface 6S to the surface 11S along a predefined depth; obviously, in the context of the present invention the grooves S1 and S2 may alternatively be formed in the switching element 12 and in the main hollow body 61, so as to extend respectively form the surface 1S and from the surface 66s.

In each one of the grooves S1 and S2, moreover, there is an annular elastic sealing element, for example made of metal or an equivalent elastic material; in particular, a sealing element B1 is housed in the groove S1, a sealing element A2 being housed in the groove S2. As is clearly explained in the following description, the sealing element B1 has the purpose to prevent any leakages and/or losses of fluid (for example gas, oil or similar fluids), while the sealing element A2 has the purpose to avoid infiltrations from the outside, for example infiltrations of sea water and/or corrosive agents.

Since the sealing elements B1 and A2 are shaped in a substantially similar manner, only one of said sealing elements is described here below, in particular the sealing element B1 housed in the annular groove S1, according to an embodiment.

Figure 7:
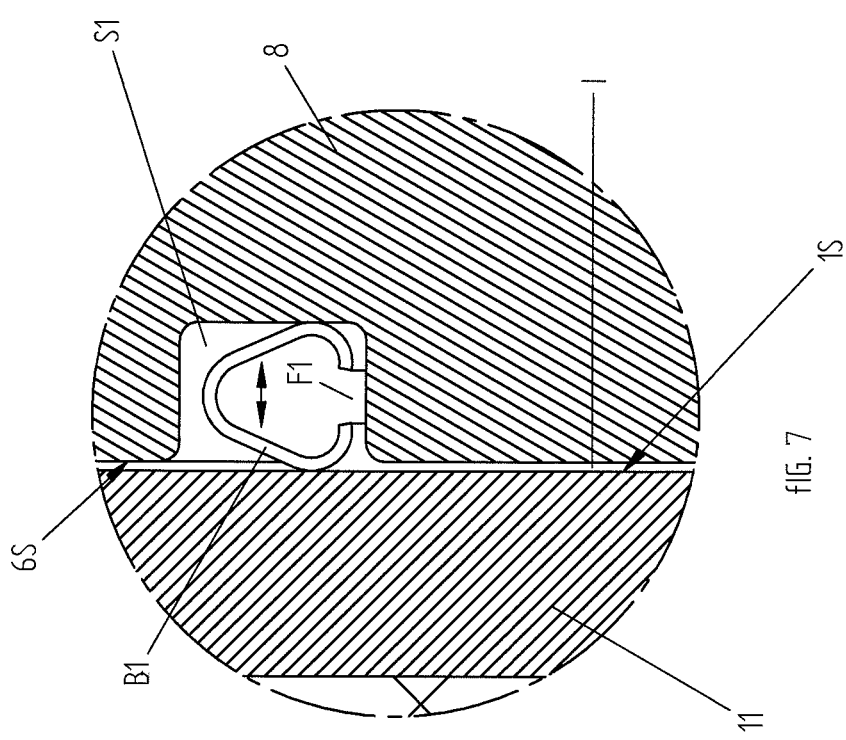

FIG. 7 shows, in particular, that the sealing element B1 has "open" cross section (perpendicular to its annular development), in particular with an opening or slit F1 that extends over the entire circumference of the ring or annular element B1.

This means that, according to a sectional view, for example that shown in FIG. 7, the element B1 comprises two opposite portions (for example rectilinear, as shown in the figure) connected by a curved connecting portion, wherein each one of the two opposite portions comprises an end portion opposite the connecting portion and also curved, the two opposite and curved end portions thus being placed at a predefined distance from each other in such a way as to define and delimit the slit F1.

It can thus be understood that the element B1, being elastic, is suited to be deformed along a direction indicated by the arrows in the figure, in particular in the two opposite directions indicated by the arrows; this means that the element B1 is suited to be "compressed" against the resistance generated by its elasticity (wherein, when the element B1 is compressed the width of the slit F1 decreases and the opposite end portions move near each other) and to be extended thanks to its elasticity, wherein during the extension the slit F1 becomes wider and the distance between the opposite end portions increases.

Furthermore, the element B1 is housed in the groove S1 so that it can come into contact with the two opposite surfaces 6S and 1S, respectively of the element 6 and of the element 12 (of flange 11).

It can thus be understood that in this way (and in the mutual closed position of the surfaces 6S and 1S, see the following description) the element B1 closes the interspace I, thus eliminating the risk of fluid leakages from the inside of the coupling 60 through the interspace I.

It should also be noted that the slit F1 faces towards the inner space of the coupling 60; in this way, the fluid possibly flowing from the inside of the coupling along the interspace I will be conveyed into the element B1, which will thus be deformed, that is, extended, so that the contact areas between the external surface of the element B1 and the surfaces 6S and 1S will consequently increase. This means, therefore, that, exploiting the pressure of a fluid in the interspace I, the element B1 can be naturally and automatically switched between the configuration shown in FIG. 7, in which the contact between the element B1 and the surfaces 6S and 1S is minimal and a configuration of increased contact and tightness (not represented in the figures) in which, compared to the configuration shown in FIG. 7, the contact between the element B1 and the surfaces 6S and 1S is increased (and also the thrusting action exerted by the element B1 against the surfaces 6S and 1S, and therefore tightness, is increased).

Figure 8:
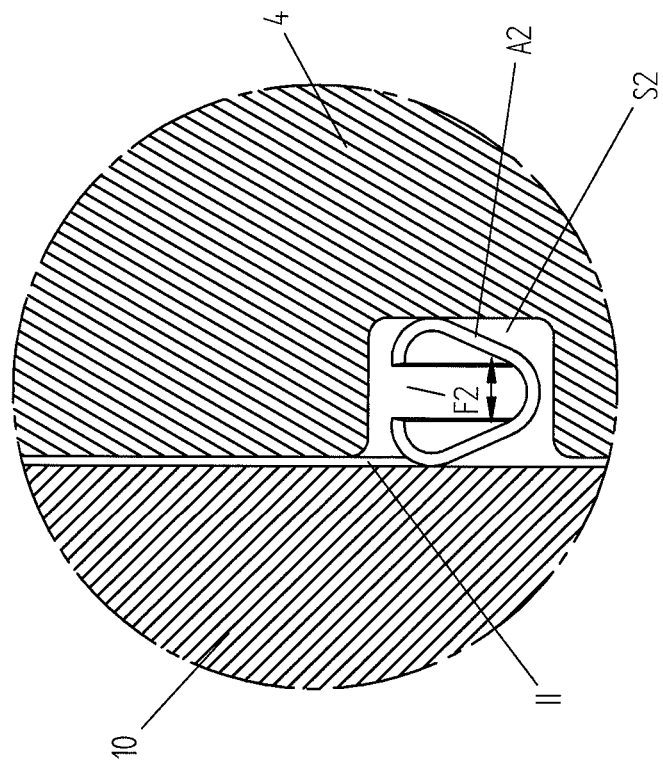
FIGS. 7 and 8 show each a sectional view of further details of the rotatable coupling according to an embodiment of the present invention.

It should also be underlined that, in the context of the present invention, each one of the sealing elements B1 and A2 can have a shape different from that shown in FIGS. 7 and 8 and described above; for example, according to a further embodiment, the sealing elements B1 and A2 (one or both) can have the shape shown in FIGS. 5 and 6, meaning with "open" cross section (perpendicular to their annular development), in particular with the opening or slit F1 extending over the entire circumference of the ring or annular element B1, but with circular transverse development, wherein, therefore, in this case the slit F1 is delimited by two symmetrical portions, each developing according to a semi-circular shape.

Having thus described the characteristics of the sealing element B1, substantially the same as those of the further sealing element A2, it should be noted that, as shown in the figures, the sealing element A2 has the slit F1 facing towards the outside of the coupling 60.

Now, again with reference to FIG. 4, it can be understood that the switching element 12 can be switched (translated along a direction parallel to the direction of longitudinal extension of the coupling 60) between a closed configuration shown in FIG. 6, in which the abutment surfaces, respectively 6S and 1S and 66S and 11S, are positioned at a minimal distance (in which each one of the sealing elements B1 and A2 is placed in contact with the surfaces 1S and 6S and 66S and 11S, respectively), and an open configuration (FIG. 5), in which the abutment surfaces, respectively 6S and 1S and 66S and 11S, are positioned at a distance that exceeds said minimal distance (and the sealing elements B1 and A2 are placed in contact only with the surfaces 6S and 66S, respectively).

The spontaneous switch-over of the element 12 from the open to the closed configuration is obtained through thrusting means 20 (for example, elastic means such as helical springs or similar elements) arranged inside suitable seats obtained in the hollow component 2.

On the contrary, the switch-over of the element 12 from the closed to the open configuration is obtained by introducing pressurized fluid (for example, gas) into one or more of the channels C1, C2 and C3 created in the flange 4, which place corresponding channels C4, C5 and C6 created in the switching element 12, in particular in flange 11, in communication with the outside.

The pressure of the fluid, in particular in channel C6, causes the translation of the element 12 against the thrust exerted by the springs 20, and therefore from the closed configuration (FIG. 6) to the open configuration (FIG. 5).

The methods for using the coupling 60 according to the present invention are summed up here below.

At the moment of installation of the coupling 60, in particular when the coupling 60 is respectively connected to the pipe fitting 202 and to the pipe portion 52, the switching element is placed and maintained in the configuration illustrated in FIG. 5, in which the elements B1 and A2 come into contact only with the abutment surfaces 6S and 66S, respectively; in this configuration, the hollow element 61 and the tubular element 6 are free to rotate with respect to each other, thanks to the presence of the interspaces I and II and to the fact that the resistance exerted by the sealing elements B1 and A2 is null (or at least minimal).

The pipe can thus be laid and any twisting force exerted on the pipe can be compensated for thanks to the free mutual rotation of the elements 61 and 6 of the coupling 60, and thus of the pipe 52 and the pipe fitting 202.

However, before proceeding to actually installing and/or laying the pipe, the operation of the sealing elements B1 and A2 is properly tested, wherein for this purpose the pressurized fluid previously introduced through the channel C3 is removed, thus allowing the thrusting elements 20 to switch the element 12 from the open configuration of FIG. 5 to the closed configuration of FIG. 6, and a second pressurized fluid (usually air) is introduced in the interspace I and in the interspace II. Alternatively, the element 12 can be switched from the open configuration of FIG. 5 to the closed configuration of FIG. 6 by introducing a pressurized gas, for example air, in the channel C1, wherein the action of the gas can be exploited alternatively to that of the thrusting means 20 or in combination with that of the thrusting means 20. In this way, the sealing elements B1 and A2 are switched over automatically, meaning that, according to the methods described above, they are further pressed and/or deformed against the elements 61 and 6. In this way, the fluid introduced in the interspace cannot flow towards the outside of the coupling due to the presence of the element B1, while the fluid introduced in the interspace II cannot flow towards the inside due to the presence of the element A2. Thus, in the absence of fluid leakages the correct operation of the sealing elements and their conformity are confirmed, while in the presence of fluid leakages the coupling is readjusted (for example, the elements 61 and 6 are further moved near each other in such a way as to reduce the interspaces I and/or II) and/or the sealing elements are adjusted and/or replaced.

Once the verification or testing step previously described has been completed, the pipe is actually laid and in this further step the pipe fitting 202 is laid on the sea bottom.

At this point, the spontaneous switch-over of the switching element 12 from the open configuration to the closed configuration will guarantee the desired tightness and the coupling can be definitively laid.

In fact, any infiltrations of sea water from the outside will switch the configuration of the elastic element A2, while any fluid losses or leakages from the inside of the coupling towards the outside will switch the configuration of the elastic element B1.

Figure 9:
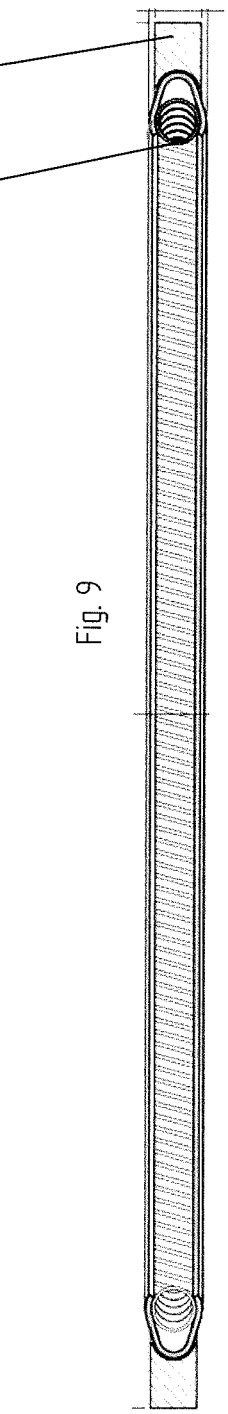
FIG. 9 shows a perspective and partially sectional view of an elastic element according to an embodiment.

FIG. 9 shows a possible further embodiment of the sealing elements that can be used in the coupling according to the present invention.

According to this embodiment, a helical spring 30 is housed (at least partially) in the inner space defined by the opposite portions (tines) of the switching element, while the connecting portion is housed in a seat in a corresponding shape obtained in an annular housing element 40.

This solution makes it possible to increase the resistance of the sealing element to pressure and to improve its elastic memory (response to deformation/pressure).

Figure 10:
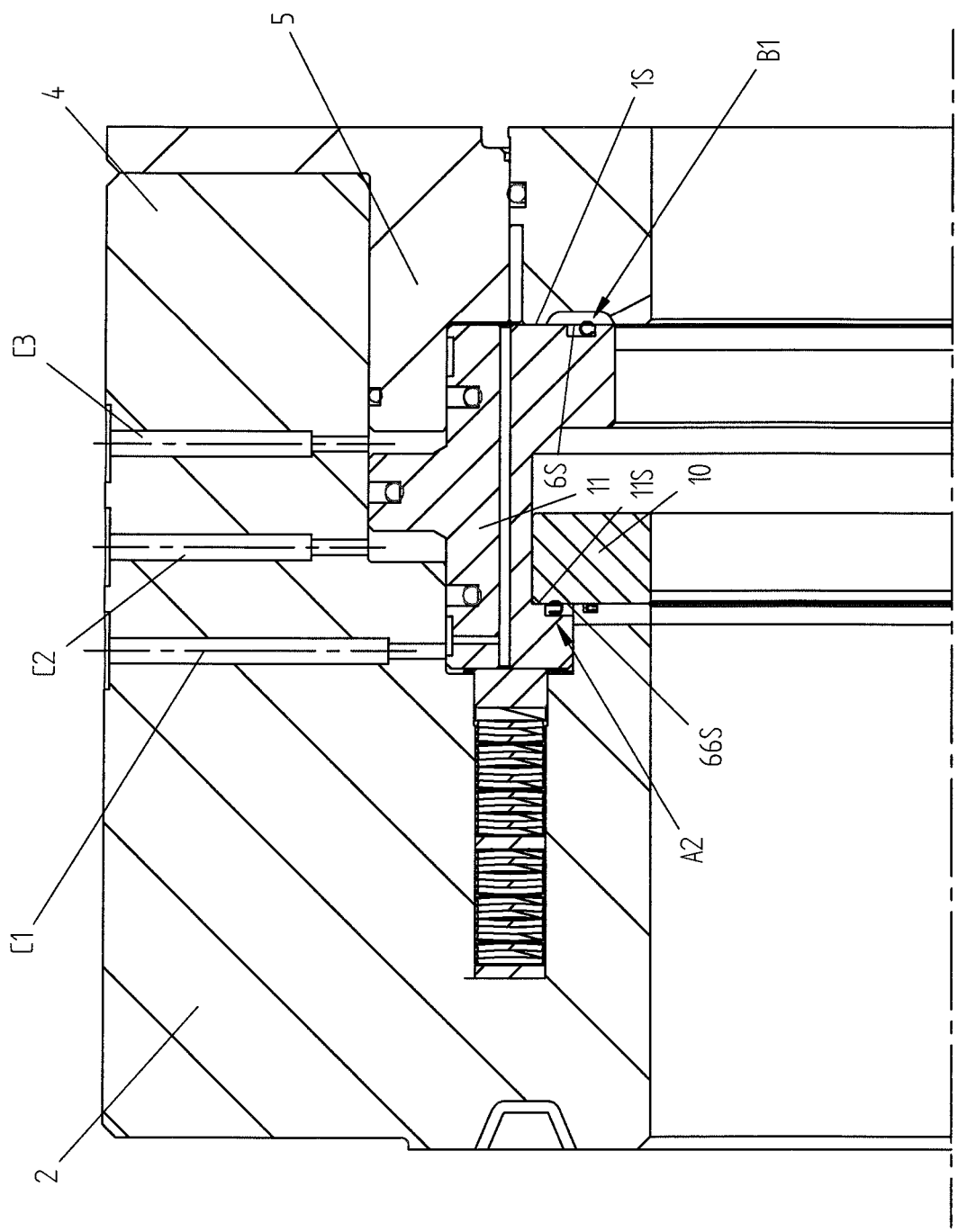
FIG. 10 shows a sectional view of a rotatable coupling according to an embodiment of the present invention in the closed configuration.

FIG. 10, in which component parts and/or characteristics of the coupling according to the present invention already described above with reference to other figures are identified by the same reference numbers, shows a possible further embodiment of the coupling according to the present invention.

The main difference between the embodiment shown in FIG. 10 and those described above concerns the structure of the switching element 12, which in this case is made up only of the flange 11, while the flange 10 is rigidly fixed to the element 2.

In this case, therefore, the thrusting elements, 20, as shown, act directly on the element or flange 11 (suited to be translated and/or switched as in the embodiments already described above), said element 11 being shaped in such a way as to define two inner flanges that in turn respectively define the abutment surface 11S (opposite the surface 66S so as to delimit the interspace II) and the surface 1S (opposite the surface 6S so as to delimit the interspace I).

Furthermore, and again as shown, in this case the grooves S2 and S1 that respectively house the sealing elements A2 and B1 are respectively defined by lowered portions of the surface 11S and of the surface 1S, respectively.

The procedures for switching the element 12 from the open configuration to the closed configuration shown in FIG. 10 are substantially similar to those described above and a detailed description thereof is omitted for the sake of brevity.

It should also be underlined that, in the case of the present embodiment, in order to switch the element 12 from the closed to the open configuration the pressurized gas is introduced through the channel C3 (like in the other embodiments), while to switch the element 12 from the open to the closed configuration the pressurized gas is introduced through the channel C2.

Finally, the pressurized gas used to actually test the sealing elements A2 and B1 is introduced in the respective interspaces II and I through the channel C1, which communicates with a lowered portion or groove obtained in the external surface of the element 11, wherein said groove in turn communicates with the longitudinal channel ending into the interspaces II and I through the channel indicated by a broken line.

It has thus been shown, by means of the previous detailed description of the embodiments of the coupling according to the present invention illustrated in the drawings, that the coupling according to the present invention makes it possible to achieve the set objects and to overcome the drawbacks that are typical of the couplings known in the art.

In particular, the present invention makes it possible to provide a rotatable coupling that guarantees both the tightness of the connection between the two elements of the coupling and the free mutual rotation of the elements of the coupling.

Furthermore, the coupling according to the present invention does not require any operation (in particular, submarine operations) for switching the configuration of the sealing elements. Furthermore, the coupling according to the present invention can be made and installed with simple methods and/or procedures and at limited cost.

Finally, it should be noticed that the special design of the coupling of the invention allows it to guarantee tightness even in the case where the external pressure (due, for example, to sea water) exceeds the internal pressure; this is obtained, in particular, by properly sizing the elastic means 20.

More particularly, increasing the thrusting force of the elastic means 20 increases the tightness of the coupling (also with respect to external pressures).

Clearly, this solution can be applied also to all of the couplings described above.

While the present invention has been described with reference to the particular embodiments shown in the figures, it should be noticed that the present invention is not limited to the specific embodiments illustrated and described herein; on the contrary, further variants of the embodiments described herein fall within the scope of the present invention.

For example, within the context of the present invention, the number of sealing elements can vary and be chosen according to the needs and/or circumstances.

The scope of the present invention is thus defined in the claims.

What is claimed is:

1. Rotatable coupling (60) for connecting pipes, said coupling comprising
   a first hollow female element (61) suited to be connected, for example, to a first portion (51) of a pipe or to a pipe fitting (202), and
   a second tubular male element (6) with a first end portion at least partially housed inside said first female element (61) so as to define an inner common space through which a fluid can flow, and with a second end portion suited to be connected to a second portion (52) of a pipe,
   said first and said second element (61, 6) being suited to be rotated with respect to each other, said second tubular male element (6) comprising a first abutment surface (6S), wherein said rotatable coupling (60) furthermore comprises a third tubular hollow element (12) housed inside said first female element and provided with a second abutment surface (1S) substantially opposite said first abutment surface (6S) in such a way as to define a first interspace (I), wherein said third hollow element is suited to be translated along a direction substantially orthogonal to said first and said second abutment surface (6S, 1S) between a closed configuration, in which said first and said second abutment surface (6S, 1S) are positioned at a minimal mutual distance from each other, and an open configuration, in which said first and said second abutment surfaces (6S, 1S) are positioned at a distance from each other that exceeds said minimal mutual distance, wherein at least one first elastic sealing element (B1) is interposed between said first and said second abutment surface (6S, 1S), and wherein with said third hollow element (12) in said closed configuration said first elastic sealing element (B1) is placed in contact with both said first abutment surface (6S) and said second abutment surface (1S)

characterized in that the surface areas of the portions of the external surface of said first elastic sealing element (B1) respectively in contact with said first and with said second abutment surface (6S, 1S) are minimal when there is no fluid and increase when said first elastic sealing element (B1), which is in the shape of a ring in longitudinal cross section, is subjected to pressure by a fluid present inside said first interspace (I).

2. Coupling (60) according to claim 1, characterized in that it comprises elastic means (20) suited to thrust said third hollow element towards said closed configuration.

3. Coupling (60) according to claim 1, characterized in that said first and said second abutment surface (6S, 1S) are annulus-shaped and substantially perpendicular to the direction of longitudinal extension of said second tubular male element (6).

4. Coupling according to claim 1, characterized in that said first elastic sealing element (B1) is provided with an opening or slit (F1) that places an inner space delimited by said first elastic sealing element (B1) in communication with an outside of said first elastic sealing element (B1).

5. Coupling according to claim 4, characterized in that said first elastic sealing element (B1), in a sectional view, comprises two portions arranged so as to define or enclose an internal angle and mutually connected by a connecting portion, the external surfaces of each one of said two portions defining an angle being in contact, respectively, with said first abutment surface and said second abutment surface (1S, 6S), with said third hollow element in the closed configuration.

6. Coupling according to claim 5, characterized in that each one of said two portions defining an angle comprises a rectilinear subportion extending from said connecting portion and a curved end portion, said two curved end portions being opposite each other so as to delimit said opening or slit (F1).

7. Coupling according to claim 6, characterized in that either said first tubular male element (6) or said third hollow tubular element (12) comprises a first annular groove or lowered portion (S1) that extends from the corresponding abutment surface (6S, 1S), and in that said first elastic sealing element (B1) is at least partially housed inside said first annular groove (S1).

8. Coupling according to claim 7, characterized in that said first groove (S3) is in communication with the inner space mutually defined by said first hollow female element (61) and said second tubular male element (6) through said first interspace (I).

9. Coupling according to claim 8, characterized in that said opening or slit (F1) is directed towards the inner space of said coupling (60) defined by said second tubular male element (6) and said first hollow female element (61).

10. Coupling (60) according to claim 1, characterized in that said first hollow female element (61) and said third tubular hollow element (12) respectively define a third abutment surface (66S) and a fourth abutment surface (11S) substantially opposite each other, in such a way as to define a second interspace (II), and in that with said third hollow element (12) in said closed configuration said third and said fourth abutment surface (66S, 11S) are positioned at a minimal mutual distance, while with said third hollow element (12) in said open configuration said third and said fourth abutment surface (66S, 11S) are positioned at a mutual distance that exceeds said minimal mutual distance.

11. Coupling (60) according to claim 10, characterized in that at least one second elastic sealing element (A2) is interposed between said third and said fourth abutment surface (66S, 11S), and in that with said third hollow element (12) in said closed configuration said second elastic sealing element (A2) is placed in contact with both said third abutment surface (66S) and said fourth abutment surface (11S).

12. Coupling (60) according to claim 11, characterized in that the surface areas of the portions of the external surface of said second elastic sealing element (A2) respectively in contact with said third and said fourth abutment surface (66S, 11S) are minimal when there is no fluid and increase when said second elastic sealing element (A2) is subjected to pressure by a fluid present in said second interspace (II).

13. Coupling (60) according to claim 12, characterized in that said third and said second abutment surface (66S, 11S) are of the annulus-shaped type and substantially perpendicular to the direction of longitudinal extension of said second tubular male element (6), and in that said second elastic sealing element (A2) is in the shape of a ring.

14. Coupling (60) according to claim 11, characterized in that said second elastic sealing element (A2) is hollow with open cross section and is provided with an opening or slit (F1) that places the inner space delimited by said second elastic sealing element (A2) in communication with the space outside said second elastic sealing element (A2), and possibly in that said second elastic sealing element (A2), in a sectional view, comprises two portions arranged in such a way as to define or enclose an internal angle and connected by a connecting portion, the external surfaces of each one of said two portions defining an angle being respectively in contact with said third and said fourth abutment surface (66S, 11S), and possibly in that each one of said two portions defining an angle comprises a rectilinear subportion that extends from said connecting portion and a curved end portion, said two curved end portions being opposite each other so as to delimit said opening or slit (F1).

15. Coupling (60) according to claim 11, characterized in that either said first hollow female element (61) or said third hollow element comprises a second annular groove or lowered portion (S2) that extends from the respective abutment surface, and in that said second elastic sealing element (A2) is at least partially housed inside said second annular groove (S2).

16. Coupling (60) according to claim 15, characterized in that said second groove (S2) is in communication with the outside of said coupling (60) through said second interspace (II).

17. Coupling according to claim 16, characterized in that said opening or slit (F1) of said second elastic sealing element (A2) is directed towards the outside of said coupling.

\* \* \* \* \*